US011429858B2

(12) United States Patent
Cmielowski et al.

(10) Patent No.: US 11,429,858 B2
(45) Date of Patent: Aug. 30, 2022

(54) DEEP LEARNING EXPERIMENT CONTENT GENERATION BASED ON SINGLE DESIGN

(71) Applicant: International Business Machines Corporation, Armonk, NY (US)

(72) Inventors: Lukasz G. Cmielowski, Cracow (PL); Rafal Bigaj, Cracow (PL); Wojciech Sobala, Cracow (PL); Pawel Slowikowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 16/374,774

(22) Filed: Apr. 4, 2019

(65) Prior Publication Data

US 2020/0320380 A1 Oct. 8, 2020

(51) Int. Cl.
 *G06F 8/35* (2018.01)
 *G06N 3/08* (2006.01)
 *G06F 16/901* (2019.01)
 *G06N 3/04* (2006.01)

(52) U.S. Cl.
 CPC .............. *G06N 3/08* (2013.01); *G06F 8/35* (2013.01); *G06F 16/9024* (2019.01); *G06N 3/0454* (2013.01)

(58) Field of Classification Search
 None
 See application file for complete search history.

(56) References Cited

U.S. PATENT DOCUMENTS

| 10,061,300 | B1 | 8/2018 | Coffman | |
|---|---|---|---|---|
| 10,885,332 | B2* | 1/2021 | Bigaj | G06N 3/08 |
| 11,010,658 | B2* | 5/2021 | Koren | G06N 3/0454 |
| 2014/0304211 | A1 | 10/2014 | Horvitz | |
| 2016/0174902 | A1 | 6/2016 | Georgescu | |
| 2018/0203956 | A1 | 7/2018 | Ng | |
| 2018/0225391 | A1 | 8/2018 | Sali | |
| 2020/0364625 | A1* | 11/2020 | Baker | G06N 3/04 |
| 2021/0165641 | A1* | 6/2021 | Gilpin | G06F 8/60 |
| 2021/0182674 | A1* | 6/2021 | Petit | G06F 8/60 |

OTHER PUBLICATIONS

Caruana et al., "Ensemble Selection from Libraries of Models", Appearing in Proceedings of the 21st International Conference on Machine Learning, Banff, Canada, 2004, Copyright 2004 by the authors, 8 pages.

* cited by examiner

*Primary Examiner* — Marina Lee
(74) *Attorney, Agent, or Firm* — Brian M. Restauro

(57) ABSTRACT

Embodiments of the present invention enable a comparison of different machine-learning models based on a single neural network design may be provided. A deep learning architecture for an experimentation framework is represented as a directed acyclic graph with nodes representing neural network layers. Embodiments of the present invention specify a first machine-learning model in a first branch and a second machine-learning model in a second branch of the directed acyclic graph. Each branch has its own optimizer node. Embodiments of the present invention generate source code for the first machine-learning model and the second machine-learning model out of the directed acyclic graph, and train the first machine-learning model and the second machine-learning model simultaneously, thereby enabling the comparison of different machine-learning models.

23 Claims, 6 Drawing Sheets

100 

| 102 SPECIFY A FIRST ML MODEL IN A FIRST BRANCH IN A DAG WITH FIRST SET OF OPTIMIZATION PARAMETERS |

| 104 SPECIFY A SECOND ML MODEL IN A SECOND BRANCH IN THE DAG WITH SECOND SET OF OPTIMIZATION PARAMETERS INDEPENDENT OF THE FIRST SET OF OPTIMIZATION PARAMETERS |

| 106 GENERATE SOURCE CODE FOR THE FIRST AND THE SECOND MACHINE-LEARNING MODEL |

| 108 TRAIN THE FIRST AND THE SECOND MACHINE-LEARNING MODEL |

FIG. 1

DEEP LEARNING EXPERIMENT CONTENT GENERATION BASED ON SINGLE DESIGN

BACKGROUND

The invention relates generally to a method for generating experiment content and comparing different machine-learning models, and more specifically, to a computer-implemented method for enabling a comparison of different machine-learning models based on a single neural network design. The invention relates further to a related machine-learning system for enabling a comparison of different machine-learning models, and a computer program product.

Machine-learning is one of the hottest topics in science as well as for enterprise information technology (IT) organizations. The vast amount of data collected over the last years is ever increasing and needs more and more sophisticated analysis tools. Classical business intelligence/business analytics tools have been proven to be very useful for IT and business users.

Storage as well as computing capacities have grown significantly over the last years, enabling a comparably easy implementation of artificial intelligence (AI) systems, either a stand-alone system or integrated into any type of application. These (AI) systems do not need to be programmed in a procedural way but can be trained with example data in order to develop a model in order to, e.g., recognize and/or classify unknown data.

Generally speaking, existing methods for machine-learning using neural networks disclose a data modeling platform including a distributed modeling ensemble generator and a process tracker. That distributed modeling ensemble generator pre-processes, models and inputs dataset according to a user listing of modeling types, modeling algorithms and preprocessing options. The generator includes a plurality of model runners, one for modeling type, and a data coordinator.

Other solutions disclose methods and apparatus for discretization, manufacturability analysis, and optimization of manufacturing process bases on computer assisted design models and machine-learning. An apparatus determines from the digital model features of a physical object. Thereafter, the apparatus produces predictive values for manufacturing processes based on regression machine-learning models.

A disadvantage of known solutions may continue to be the time-consuming manual setup process and development of machine-learning (ML) models in order to find a problem specific ML model to be trained with training data and delivering a good accuracy, i.e., quality in recognizing and classifying unknown data.

Hence, there may be a need to overcome mentioned disadvantages and to enable a faster machine-learning model development, i.e., a faster development of machine-learning experiment content.

SUMMARY

According to one aspect of the present invention, a computer-implemented method for enabling a comparison of different machine-learning models based on a single neural network design may be provided. A deep learning architecture for an experimentation framework may be represented as a directed acyclic graph, in which nodes may represent neural network layers.

The method may comprise specifying a first machine-learning model in a first branch of the directed acyclic graph, wherein the first machine-learning model may comprise at least one first optimizer node with a first set of related optimizer parameters, and specifying a second machine-learning model in a second branch of the directed acyclic graph, wherein the second machine-learning model may comprise at least one second optimizer node with a second set of related optimizer parameters, which may be different to the first optimizer node.

The method may further comprise generating source code for the first machine-learning model and the second machine-learning model out of the directed acyclic graph, and training the first machine-learning model and the second machine-learning model simultaneously, thereby, enabling the comparison of different machine-learning models.

According to another aspect of the present invention, a machine-learning system for enabling a comparison of different machine-learning models may be provided. The different machine-learning models may be based on a single neural network design. A deep learning architecture for an experimentation framework may be represented as a directed acyclic graph with nodes representing neural network layers.

The system may comprise a directed acyclic graph module adapted for specifying of a first machine-learning model in a first branch of the directed acyclic graph. The first machine-learning model may comprise at least one first optimizer node with a first set of related optimizer parameters. The directed acyclic graph module may also be adapted for specifying a second machine-learning model in a second branch of the directed acyclic graph, wherein the second machine-learning model may comprise at least one second optimizer node with a second set of related optimizer parameters which is different to the first optimizer node.

Furthermore, the system may comprise a generator module adapted for generating source code for the first machine-learning model and the second machine-learning model out of the directed acyclic graph, and a training unit adapted for facilitating a training for the first machine-learning model and the second machine-learning model simultaneously, thereby, enabling the comparison of different machine-learning models.

The proposed computer-implemented method for enabling a comparison of different machine-learning models based on a single neural network design may offer multiple advantages and technical effects:

The proposed concept may combine a plurality of aspects of developing machine-learning models for AI solutions. Firstly, a single neural network design using a deep learning architecture as an experimentation framework may be used and represented as a directed acyclic graph in which different—in particular, a plurality of—nodes may represent different neural network layers.

Thus, the data scientists may recognize directly, in a graphical manner, the different layers of a neural network with a plurality of hidden layers. The use of the directed acyclic graph allows an elegant way to design different branches with different optimizer nodes included in each branch. Thus, different machine-learning models may be represented by the different branches. The different optimizer nodes included in each branch may be used during the learning process and back propagation in order to tune and fine-tune of the hyper-parameters—e.g., weight factors and activation functions—of the different neural network layers.

An advantage feature of such a design may be in the fact that the different machine-learning models may be trained simultaneously, i.e., in parallel, saving a lot of time in developing machine-learning experiment content, i.e., developing different ML models to be compared and to decide which model may best fit to a given problem.

Thereby, the number of branches in the directed acyclic graph (DAG) is not limited to only two branches. More than two branches representing different ML models with different optimizer nodes may be used in parallel. Additionally, it may also be useful, to position the optimizer nodes—in particular in parallel—in one of the branches (or more than one of the branches of the DAG) in order to increase the ML models testable in parallel.

Furthermore, another design option would be in the positioning a single optimizer node in a combined position of both branches of the DAG, i.e., a merging optimizer node. Thus, e.g., two branches of the DAG may have the same, similar or even different nodes—in particular hidden layers—but the same optimizer node. By having different hyper-parameters for the different nodes in the different branches, also in such a deep learning design different ML models may be trained and tested in parallel.

Hence, a large plurality of design options for machine learning models using a single directed acyclic graph may become possible elegantly. Moreover, all these models may be trained and tested in parallel saving a lot of time for machine-learning model development by data scientists.

In the following, additional embodiments of the inventive concept—applicable to the method as well as to the related system—will be described.

According to one permissive embodiment of the method, the specifying a first machine-learning model in a first branch of the directed acyclic graph may also comprise specifying a third optimizer node with a third set of related optimization parameters which may be positioned in parallel to the first optimizer node. Furthermore, more than a second optimizer node may be positioned in the first branch of the DAG, eventually at an end of the branch. This may increase the number of models being trainable at the same time.

According to another permissive embodiment of the method, the specifying a second machine-learning model in a second branch may also comprise specifying a forth optimizer node with a fourth set of related optimization parameters which may be positioned in parallel to the second optimizer node. More than two optimizer nodes may be allowable within the second branch. This may increase the number of models being trainable at the same time. The same may be applicable to a third and additional branches in the DAG.

According to one advantageous embodiment, the method may comprise comparing quality accuracy values of the first trained machine-learning model against the second trained machine-learning model—and in particular also further machine-learning models developed, trained and tested in parallel—using validation and determining the machine-learning model generating better quality values. This parallel development, deployment and testing of different machine learning models may—as already explained above in more detail—speed up the process of machine-learning model development. Thus, available resources—in particular computing resources, storage resources as well as time of data scientists—may be optimized.

According to one additionally advantageous embodiment of the method, the comparison of the quality values may be performed by a comparison node in the directed acyclic graph. The comparison node may use the quality accuracy values of the first trained machine-learning model and the second trained machine-learning model as input values, thereby determining which of the first or second machine-learning model is the better one in an A/B testing approach. Furthermore, this feature may help to increase the development speed for different machine-learning models. The concept may elegantly be expanded to more than two branches in the DAG and more than one optimizer node per branch of the DAG.

According to one preferred embodiment of the method, the deep learning architecture may be a convolutional neural network (CNN). CNNs have been proven to be successfully implementable in image recognition, text analysis and NLP (natural language processing). However, the proposed concept may not be limited to convolutional neural networks but may successfully be implemented in any type of neural networks.

According to one useful embodiment of the method, the directed acyclic graph may comprise in each of the first and the second branch a plurality of hidden layers. This may also apply to additional branches in the DAG. Thus, data scientists may have a large degree of freedom of designing the different machine learning models choosing from a large plurality of different hidden layers in the neural network. Each of the hidden layers may represent another node in the DAG.

According to another advantageous embodiment of the method, the first and the second optimizers are different. This may represent one option to optimize the different machine-learning models in the different branches by feeding back differently to the machine-learning model, i.e., the different hidden layers (back-propagation). For example, in one branch of the DAG as optimizer node, a stochastic gradient descent node may be used wherein in the other branch an adaptive momentum estimation (ADAM) optimizer node may be used. Because different optimizer nodes may result in different machine-learning models, the usage of different optimizer nodes may be instrumental to quickly develop different machine learning models.

According to one optional embodiment of the method, the first optimizer node and the second optimizer node may be the same optimizer node. Thus, the first branch of the DAG and the second branch of the DAG are merged together at a jointly used optimizer node. However, this does not mean that the different branches represent identical machine-learning models. If the nodes—in particular the hidden layers or only their hyper-parameters—in the different branches are different, also different machine-learning models may be represented by the different branches even if the optimizer node is the same and using the same algorithm. Additionally, different hyper parameters may be used for the nodes in the different branches.

According to a further allowable embodiment of the method, the nodes representing neural network layers may be different in the first and the second branch of the directed acyclic graph. Thus, the branches do not need to have the same number and/or identical hidden layers and/or identical hyper-parameters for their nodes.

According to additionally allowable embodiments of the method, the first and the second optimizer node—as well as further optimizer nodes—may be selected out of the group comprising an SGD node, an Adam node, an RMSprop (root mean square proportional) node, an Adagrad node, an Adadelta node, and Adamax node, and a Nadam (Nesterov supported Adam algorithm) node. However, also other optimizer nodes representing other optimization algorithms may be used for any of the optimizer nodes in the deep learning architecture represented by the DAG. The mentioned optimization algorithms shall be known by skilled people in the art. Other optimizer nodes may also be used.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings:

FIG. 1 shows a block diagram of an embodiment of the inventive computer-implemented method for enabling a comparison of different machine-learning models based on a single neural network design.

Figure 2:
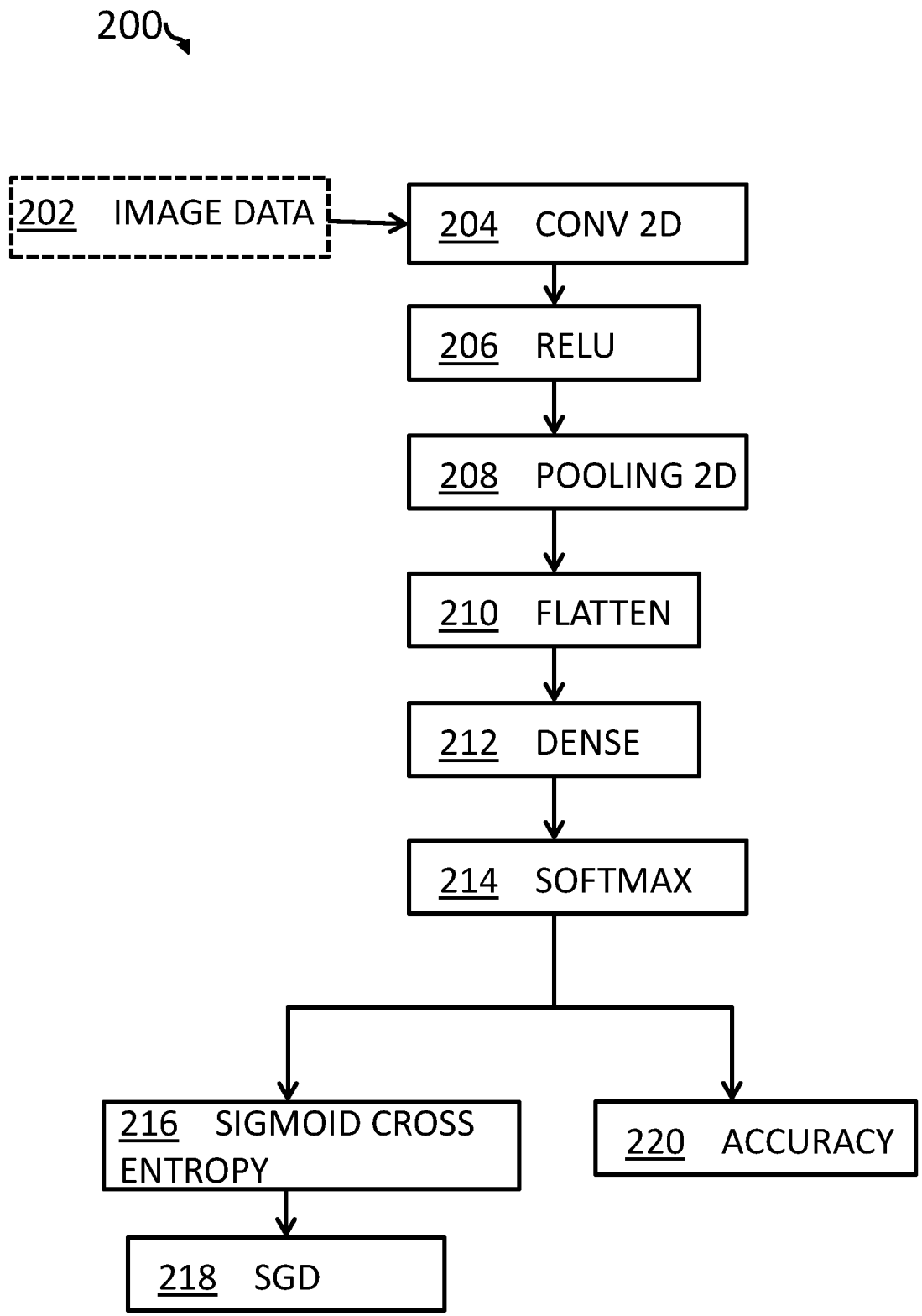

FIG. 2 shows a block diagram of a directed acyclic graph of nodes of a neural network.

Figure 3:
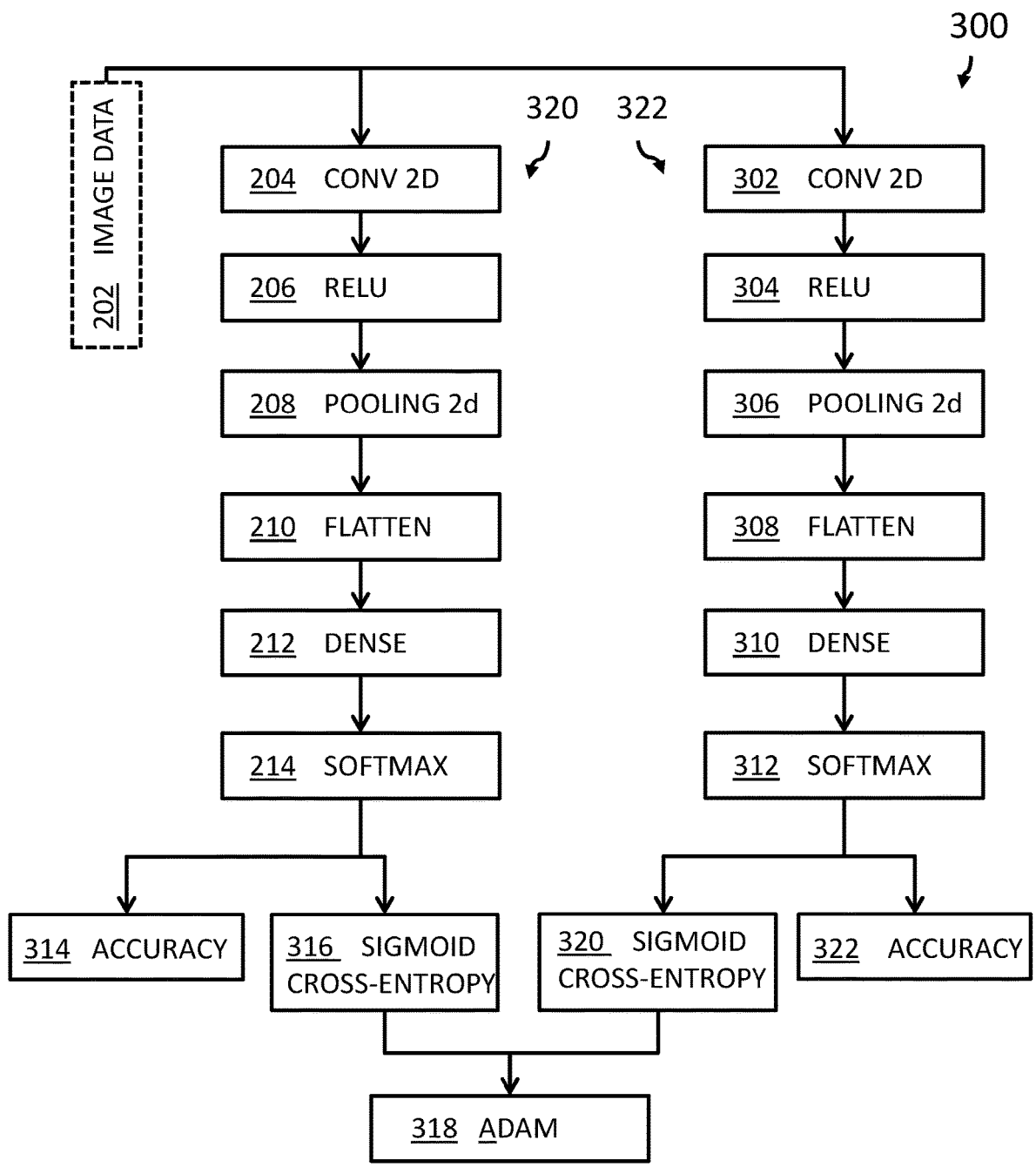

FIG. 3 shows another exemplary embodiment of a DAG.

Figure 4:
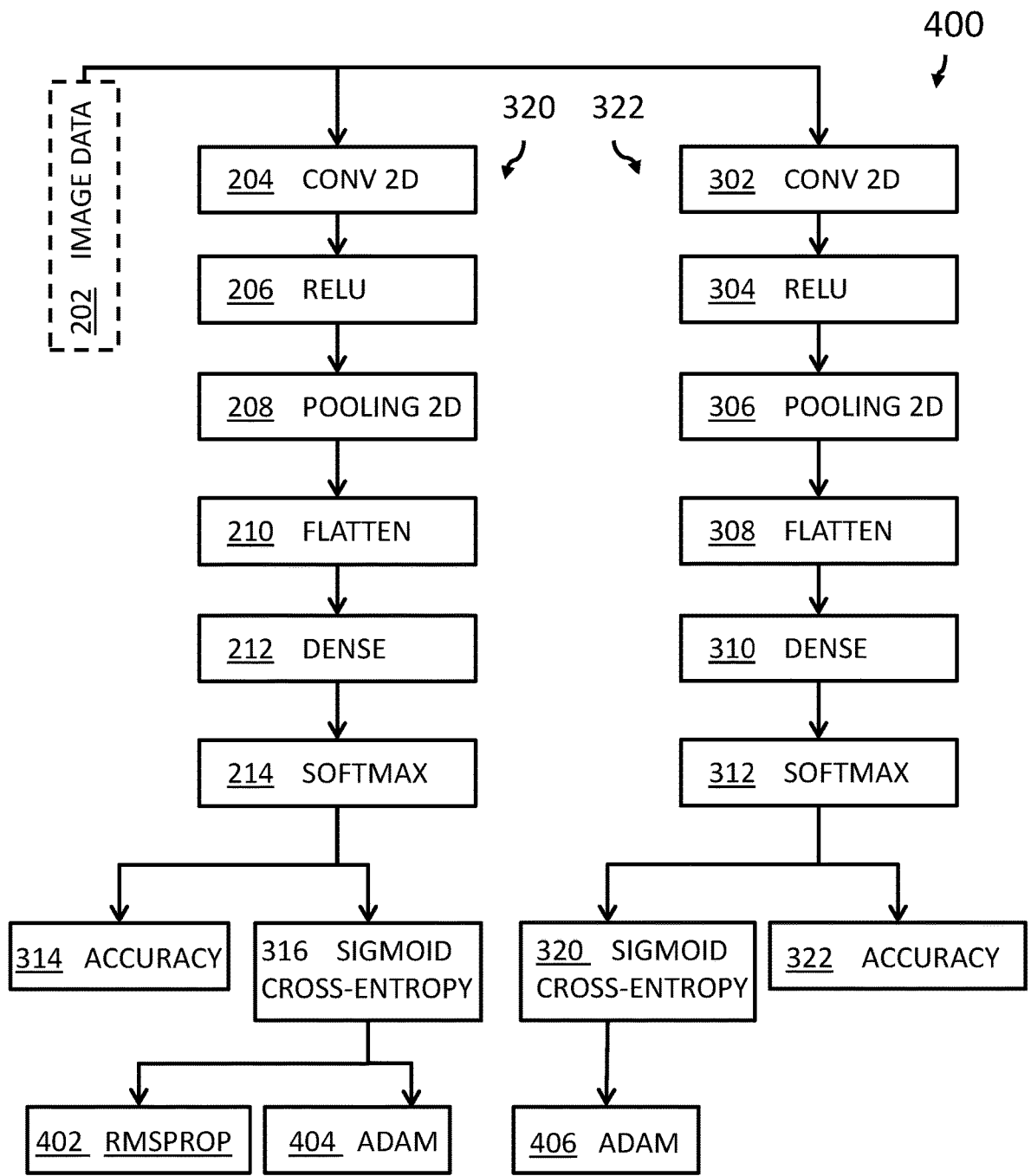

FIG. 4 shows a block diagram of an exemplary DAG with two branches which are independent from each other.

Figure 5:
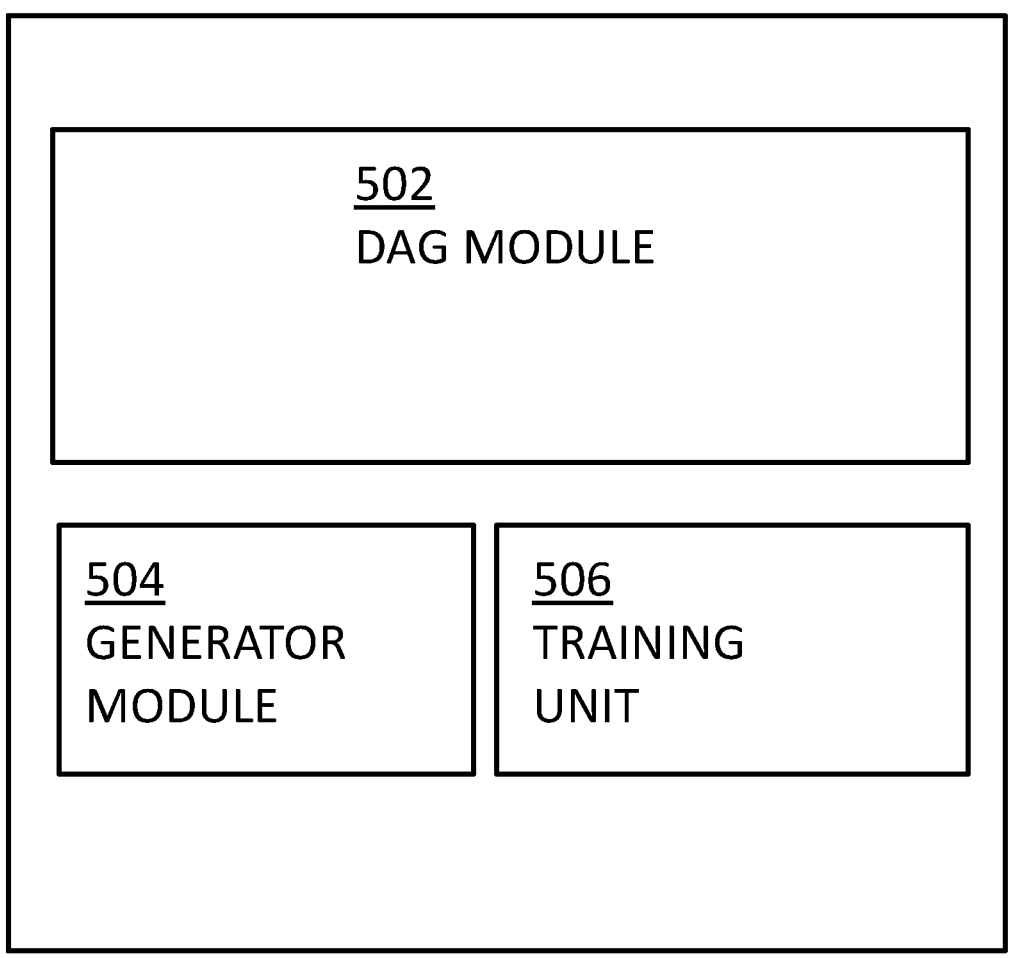

FIG. 5 shows a block diagram of an embodiment of the machine-learning system for enabling a comparison of different machine-learning models based on a single neural network design.

Figure 6:
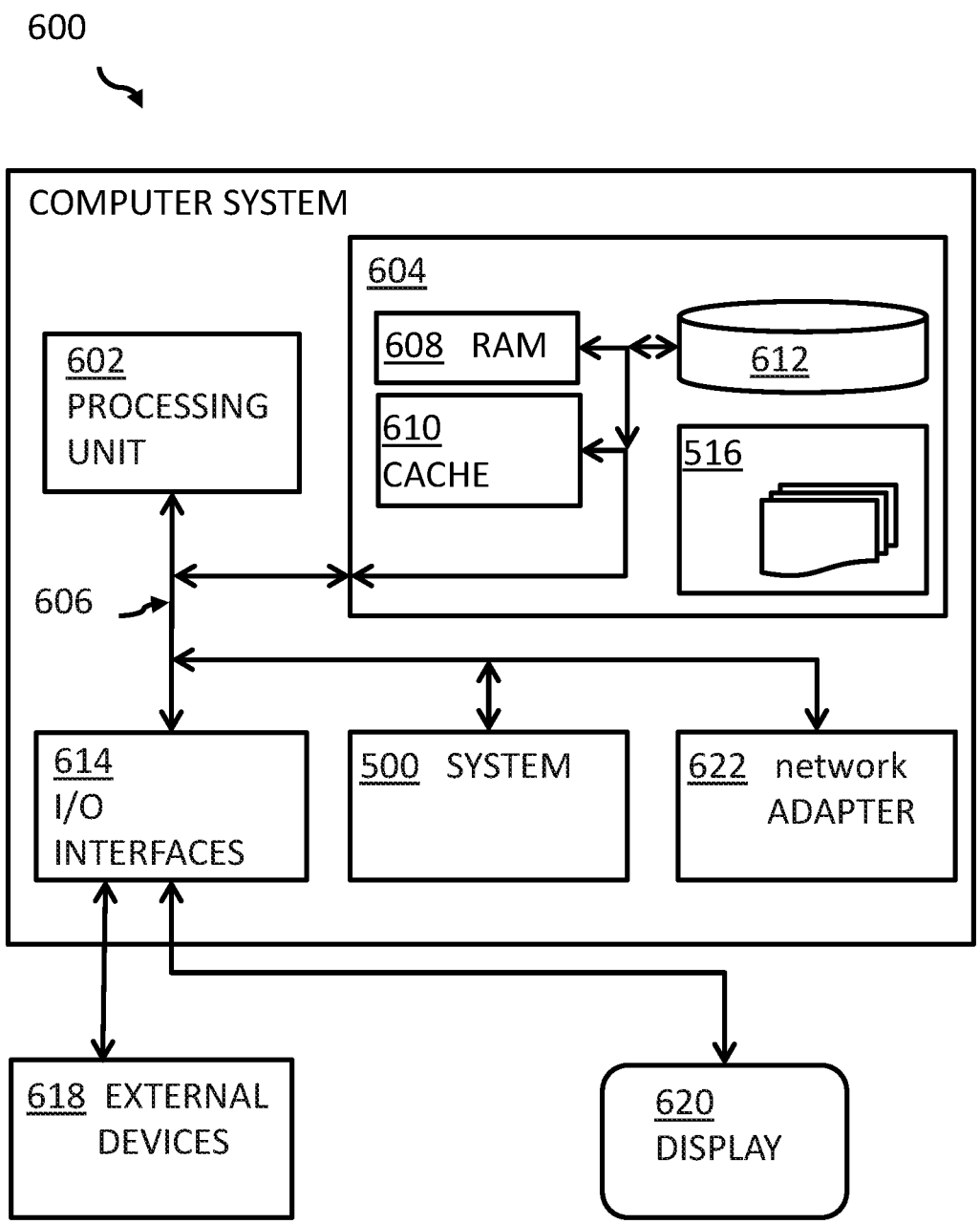

FIG. 6 shows an embodiment of a computing system comprising the machine-learning system according to FIG. 5.

DETAILED DESCRIPTION

Embodiments of the present invention recognize that analyzing semi-structured or unstructured data becomes more and more difficult with a traditional analytics approach. Specifically, embodiments of the present invention recognize that machine-learning model development is a workforce intensive and time-consuming process for the rare species of data scientists. Everything that helps the data scientists to improve the machine-learning modeling process is highly welcomed by the industry. Existing solutions provide for a data modeling platform including a distributed modeling ensemble generator and a process tracker. That distributed modeling ensemble generator pre-processes and models and inputs dataset according to a user listing of modeling types, modeling algorithms and preprocessing options. The generator includes a plurality of model runners, one for modeling type, and a data coordinator. Furthermore, other solutions provide discretization, manufacturability analysis, and optimization of manufacturing process bases on computer assisted design models and machine-learning. An apparatus determines from the digital model features of a physical object. Thereafter, the apparatus produces predictive values for manufacturing processes based on regression machine-learning models.

A disadvantage of known solutions may continue to be the time-consuming manual setup process and development of machine-learning (ML) models in order to find a problem specific ML model to be trained with training data and delivering a good accuracy, i.e., quality in recognizing and classifying unknown data. Hence, there may be a need to overcome mentioned disadvantages and to enable a faster machine-learning model development, i.e., a faster development of machine-learning experiment content.

In the context of this description, the following conventions, terms and/or expressions may be used:

The term 'machine-learning' (ML) may denote here the scientific study of algorithms and statistical models that computer systems may use to progressively improve their performance on a specific task. Machine learning algorithms may build a mathematical model—namely, the machine-learning model—of sample data, known as "training data", in order to make predictions or decisions/classifications without being explicitly programmed to perform the task. Machine-learning algorithms are used in a variety of applications, where it is infeasible to develop an algorithm of specific instructions for performing the task. Machine learning is closely related to computational statistics, which focuses on making predictions using computers. The study of mathematical optimization delivers methods, theory and application domains to the field of machine learning.

The term 'single neural network design' may denote a representation of different nodes, i.e., different hidden layers of a neural a network, in a single directed acyclic graph. Thus, a plurality of different machine learning models enabled through a plurality of different nodes in the DAG may all be part of the same integrated DAG.

The term 'deep learning architecture' may denote here an architecture representing a neural network, in particular a deep neural network. A simple neural network may comprise an input layer, an output layer and one hidden layer in between the input and the output layer. In contrast to this, a deep neural network comprises—besides the input and the output layer—a plurality of layers between the input and the output layer, i.e., a plurality of connected hidden layers. In fully connected new networks, each artificial neuron in a layer may be connected to all artificial neurons of the previous layer. Each of the different layers may be represented by a plurality of parallel artificial neurons. The connections may have related weighing factors and the artificial neurons may function according to individual activation functions. It may also be noted here that the term node may represent a complete layer of the neural network because of its representation in the DAG. Thus, a differentiation should be made between a node and an artificial neuron in this document.

The term 'experimentation framework' may denote a combination of a plurality of elements, in particular the directed acyclic graph and a related editor to design the sequence and links between different nodes of the neural network and its dependencies. By interactively receiving sets of parameters, weighing factors, activation functions and other characteristic metric values for individual nodes of the neural network, it becomes possible to design a plurality of different machine learning models for an underlying neural network.

The term 'directed acyclic graph' (DAG) may denote a finite director graph with no directed cycles. That is, it may consist of finitely many vertices and edges (also called links), with each edge directed from one vertex to another, such that there is no way to start at any vertex v and follow a consistently-directed sequence of edges that eventually loops back to v again. In the hear use terminology a vertex may be equivalent to a node, i.e., a layer in the neural network.

The term 'branch of the directed acyclic graph' may denote a sequence of nodes in the DAG representing different nodes of the neural network.

The term 'optimizer node' may denote one node in a neural network—typically positioned near an end of a sequence of different nodes, i.e., hidden layers, of a neural network—designed to generate signals during a training session to tweak the weights and activation functions of previous nodes, i.e., previous layers in the neural network in order to minimize a cost—also known as loss—function. Thus, the optimizer node may generate for each training data set a little adjustment to the weights and activation functions of the artificial neurons in the different layers of the neural network. Hence, a different set of training data may lead to different sets of weights and activation functions of the different artificial neurons in the neural network.

The term 'source code' may denote a set of program code as well as hyper-parameters for the different layers, i.e., nodes, of the neural network. The activated source code may enable a training of the neural network as well as a generation of output values if new, unknown data are input to the neural network.

The term 'quality accuracy value' may denote an indicator, typically in form of an integer value, indicating how good a trained neural network is able to identify, classify, or recognize unknown, new data which have not been part of the training data.

The term 'comparison node' may denote a node as part of the DAG and able to compare quality metric values. i.e., accuracy values, of different machine-learning models in a single neural network design, i.e., the here used experimentation framework. Hence, the comparison node may be adapted to perform an A/B testing, in which "A" may represent one machine-learning model A and "B" may represent another machine-learning model B.

The term 'convolutional neural network' may denote a special form of a neural network in which—typically in the beginning of a sequence of hidden layers—one tries to reduce the number of required artificial neurons per layer of the neural network significantly. This may typically be performed by using a convolutional function to compress information of a plurality of artificial neurons of an earlier layer to a lower number of artificial neurons—typically one artificial neuron from a plurality of artificial neurons of the previous layer—in order to reduce the complexity and the required computational power for the neural network.

The terms 'SGD node, Adam node, RMSprop node, Adagrad node, Adadelta node, Adamax node, Nadam node' may denote a selection of optimizer nodes often used in neural networks. They may, e.g., be used for generating feedback information required for an optimization of the settings—e.g., weight factors, activation functions, etc., of the different previous layers of artificial neurons in the n-dimensional space during a training with training data of the neural network. More optimizer nodes are known and may also be used in the context of the here presented concept. The different optimizers differ typically in the mathematical way the feedback information is derived from differences between an actual output value of a neural network in comparison to the expected output value, i.e., the label relating to the input data for a training phase.

In the following, a detailed description of the figures will be given. All instructions in the figures are schematic. Firstly, a block diagram of an embodiment of the inventive computer-implemented method for enabling a comparison of different machine-learning models based on a single neural network design is given. Afterwards, further embodiments, as well as embodiments of the machine-learning system for enabling a comparison of different machine-learning models, will be described.

FIG. 1 shows a block diagram of an embodiment of the computer-implemented method 100 for enabling a comparison of different machine-learning models based on a single neural network design, wherein a deep learning architecture for an experimentation framework is represented as a directed acyclic graph, in which nodes are representing different neural network layers. The method comprises specifying, 102—in particular, graphically—a first machine-learning model in a first branch of the directed acyclic graph, wherein the first machine-learning model comprising at least one first optimizer node with a first set of related optimizer parameters. The optimizer node may, e.g., be positioned at an end of the branch.

Standard graphical tools, like Node-RED, are available for these steps. A designer links selected elements graphically and the tools selects and adds required parameters automatically from a database. Furthermore, the designer may adapt the automatically chosen parameters according to the needs of the specific machine-learning model he wants to implement.

Furthermore, the method 100 comprises specifying, 104, a second machine-learning model in a second branch of the directed acyclic graph. The second machine-learning model comprises at least one second optimizer node with a second set of related optimizer parameters, different to the first optimizer node. Thus, the optimizer node may be—not necessarily—different if compared to the first optimizer node in the first branch.

The designer can again define steps of the machine-learning model by choosing and positioning graphically selected model elements with adaptable parameters; this process is a bit comparable to using a CAD tool or a modern software development/software programming environment like Eclipse.

Additionally, the method 100 comprises generating, 106, source code for the first machine-learning model and the second machine-learning model out of information and meta data of the directed acyclic graph, and training, 108, the first machine-learning model and the second machine-learning model simultaneously, i.e., in parallel. Identical or different training data may be used per branch. Thereby, a comparison of different machine-learning models—trained in parallel—may become possible elegantly.

The method makes use of machine-learning design tools (e.g., Node-RED) in order to generate the source code which may be understood as a parameter setting of the used (and selected) general machine-learning models (like, conv2D, ReLU, pooling2D, softmax, sigmond, etc.). However, using the machine-learning design tools and a manually setting of the parameters may not be required because the design tool can use a standard set of parameters. The parameters—like (in case of a neural network) the weighing factors, the threshold functions or offset values—may be modified during training anyway.

In contrast to this, the designer may define—also for the case of a neural network—the number of input nodes, the number of hidden layers and/or the number of output nodes at the output layer. Such parameters may also be denoted as hyper-parameters of the machine-learning model.

FIG. 2 shows a block diagram of an exemplary directed acyclic graph 200 of nodes of a neural network. The graph itself starts with the convolution 2D layer 204. The sensory data may be received, e.g., image data 202, and fed via an input layer (not shown) of the neural network to the convolution layer 204. In neural networks, one of the goals is often to reduce the number of nodes per layer significantly in the beginning of a sequence of neural network layers. The convolution 2D layer may be instrumental for this.

A series of additional typical and exemplary layers follow: a ReLU layer 206 (rectified or rectifying linear unit), a pooling 2D layer 208, a flattened layer 210, a dense layer 212 and a softmax layer 214. All of these layers may be self-explanatory to a person skilled in the art and therefore not be discussed in detail here. The types and number of hidden layers may vary from DAG to DAG.

At this point of the DAG, a sigmoid cross-entropy layer 216 followed by an SGD (stochastic gradient decent) layer 218 may follow in a sub-branch, typically used for generating back-propagation information to the neural network under training. On the other side, an accuracy determining unit 220 may also be part of the DAG. This unit may be instrumental for a determination of the accuracy or quality of the trained neural network. It delivers basically a metric value indicating how good the training was and how good unknown new image data 202 provided to the neural network may be recognized and/or classified.

FIG. 4—which should be discussed next in an out-of-sequence fashion—shows a block diagram of an exemplary DAG 400 with two branches 320, 322 (compare FIG. 2) which are independent from each other. For simplicity reasons, both core branches comprise the same nodes representing the same neural network layers, as already discussed in FIG. 2. However, it may not be necessarily that the layers 204 to 214 are identical in both branches of the DAG. On the other side, they may comprise the same nodes but the hyper-parameters per node may be different, so that also different machine-learning models are represented.

Each branch of the DAG finally splits into two sub-branches: in each branch parallel to accuracy units 314, 322 are shown as well as sigmoid cross-entropy nodes 316, 320. The sigmoid cross-entropy nodes 316, 320 may be seen as a sort of normalization function. However, at this point the two branches 320, 322 show different optimizer nodes. Branch 322 ends with an Adam optimizer node 406, whereas branch 320 ends with two different nodes, in RMSprop optimizer node 402 and a parallel Adam optimizer node 404.

For the general idea of the proposed concept, only one optimizer node which may be independent from another optimizer node in another branch may be required. However, FIG. 4 shows a further enhanced embodiment of the general underlying concept requiring only one optimizer node per branch.

FIG. 3 shows another exemplary embodiment of a DAG 300. Also here, the core parts of the branches 320, 322 are shown as identical nodes 204 to 214 and 302 to 312. The nodes have already been discussed above. Generally, also other units—also more or less—may be used in each of the branch. However, as a final node 318 a jointly optimizer node—e.g., an Adam optimizer node—may be used by both branches. The accuracy units 314, 322 and the sigmoid cross-entropy nodes 316 and 320 have already been discussed in context of FIG. 4.

Such a design of the DAG may also support the proposed general concept. Even if the optimizer node 318 is identical for both branches 320, 322, the different machine-learning models in the two branches 320, 322 may be different because the nodes per branch may be different or, if they are identical, the hyper-parameters may be different in the different branches, so that different machine-learning models are represented.

It may also be possible that more than two branches may be designed in a DAG with more or less or different nodes, as shown in the exemplary DAGs of FIGS. 3 and 4. However, the different branches in the DAG should represent different machine-learning models, i.e., at least the hyper-parameters should be different per branch.

If a DAG may have been designed by a data scientist, the code and parameters required for the different layers for the neural network may be generated in an interactive way during a design process. The training of the different machine-learning models may be performed in parallel, i.e., simultaneously, so as to speed up the process of designing, training and evaluating the different machine-learning models represented by the different branches of the DAG.

FIG. 5 shows a block diagram of an embodiment of the machine-learning system 500 for enabling a comparison of different machine-learning models based on a single neural network design, wherein a deep learning architecture for an experimentation framework is represented as a directed acyclic graph, wherein the different neural network layers are represented by different nodes of the DAG.

The system 500 comprises a directed acyclic graph module 502 adapted for specifying of a first machine-learning model in a first branch of the directed acyclic graph. The first machine-learning model comprises at least one first optimizer node with a first set of related optimizer parameters. The directed acyclic graph module 502 is also adapted for specifying a second machine-learning model in a second branch of the directed acyclic graph. The second machine-learning model comprises at least one second optimizer node with a second set of related optimizer parameters. Typically, the two optimizer nodes are different; however, this is not required.

Additionally, the system 500 comprises a generator module 504 adapted for generating source code for the first machine-learning model and the second machine-learning model out of the directed acyclic graph, and a training unit 504 adapted for facilitating a training for the first machine-learning model and the second machine-learning model simultaneously. Thereby, machine-learning content of experiments for the machine-learning as well as a comparison of different machine-learning models may be facilitated in an elegant way. Additional modules may be added to the system for a more complete embodiment.

The generating the source code for the first and the second machine-learning model may be designed as an interactive process during which an operator may input a plurality of different power meters, weights, activation function values of the different nodes as well as other framework parameters. This may enable an elegant way of specifying the different machine-learning models art of the DAG.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 6 00, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the machine-learning system 500 for enabling a comparison of different machine-learning models may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method comprising:
   enabling a comparison of different machine-learning models based on a single neural network design, wherein a deep learning architecture for an experimentation framework is represented as a directed acyclic graph with nodes representing neural network layers, wherein enabling a comparison of different machine-learning models comprises:
   specifying a first machine-learning model in a first branch of the directed acyclic graph, the first machine-learning model comprising at least one first optimizer node with a first set of related optimizer parameters;
   specifying a second machine-learning model in a second branch of the directed acyclic graph, the second machine-learning model comprising at least one second optimizer node with a second set of related optimizer parameters, different to the first optimizer node;
   generating source code for the first machine-learning model and the second machine-learning model out of the directed acyclic graph; and
   training the first machine-learning model and the second machine-learning model simultaneously, thereby enabling the comparison of different machine-learning models.

2. The computer-implemented method of claim 1, wherein the specifying a first machine-learning model in a first branch of the directed acyclic graph comprises:
   specifying a third optimizer node with a third set of related optimization parameters, parallel to the first optimizer node.

3. The computer-implemented method of claim 1, wherein the specifying a second machine-learning model in a second branch comprises:
   specifying a fourth optimizer node with a fourth set of related optimizer parameters, parallel to the second optimizer node.

4. The computer-implemented method of claim 1, further comprising:
   comparing quality accuracy values of the first trained machine-learning model against the second trained machine-learning model using validation and determining the machine-learning model generating better quality values.

5. The computer-implemented method of claim 4, wherein the comparison of the quality values is performed by a comparison node in the directed acyclic graph, the comparison node using the quality accuracy values of the first trained machine-learning model and the second training machine-learning model as input values, thereby determining which of the first or second machine-learning model should be used in an A/B testing.

6. The computer-implemented method of claim 1, wherein the deep learning architecture is a convolutional neural network.

7. The computer-implemented method of claim 1, wherein the directed acyclic graph comprises in each of the first and the second branch a plurality of hidden layers.

8. The computer-implemented method of claim 1, wherein the first optimizer is different to the second optimizer.

9. The computer-implemented method of claim 1, wherein the first optimizer node and the second optimizer node is the same optimizer node.

10. The computer-implemented method of claim 1, wherein the nodes representing neural network layers are different in the first and the second branch of the directed acyclic graph.

11. The computer-implemented method of claim 1, wherein the first and the second optimizer node is selected out of the group comprising an SGD node, an Adam node, an RMSprop node, an Adagrad node, an Adadelta node, and Adamax node, and a Nadam node.

12. A computer program product comprising:
   one or more computer readable storage media and program instructions stored on the one or more computer readable storage media, the program instructions comprising:
   program instructions to enable a comparison of different machine-learning models based on a single neural network design, wherein a deep learning architecture for an experimentation framework is represented as a directed acyclic graph with nodes representing neural network layers, wherein enabling a comparison of different machine-learning models comprises:
   program instructions to specify a first machine-learning model in a first branch of the directed acyclic graph, the first machine-learning model comprising at least one first optimizer node with a first set of related optimizer parameters;
   program instructions to specify a second machine-learning model in a second branch of the directed acyclic graph, the second machine-learning model comprising at least one second optimizer node with a second set of related optimizer parameters, different to the first optimizer node;
   program instructions to generate source code for the first machine-learning model and the second machine-learning model out of the directed acyclic graph; and
   program instructions to train the first machine-learning model and the second machine-learning model simultaneously, thereby enabling the comparison of different machine-learning models.

13. The computer program product of claim 12, wherein the program instruction to specify a first machine-learning model in a first branch of the directed acyclic graph comprise:
   program instructions to specify a third optimizer node with a third set of related optimization parameters, parallel to the first optimizer node.

14. The computer program product of claim 12, wherein the program instruction to specify a second machine-learning model in a second branch comprise:
  program instructions to specify a fourth optimizer node with a fourth set of related optimizer parameters, parallel to the second optimizer node.

15. The computer program product of claim 12, wherein the program instructions stored on the one or more computer readable storage media further comprise:
  program instructions to compare quality accuracy values of the first trained machine-learning model against the second trained machine-learning model using validation and determining the machine-learning model generating better quality values.

16. The computer program product of claim 15, wherein the program instructions to compare of the quality values is performed by a comparison node in the directed acyclic graph, the comparison node using the quality accuracy values of the first trained machine-learning model and the second training machine-learning model as input values, thereby determining which of the first or second machine-learning model should be used in an AB testing.

17. The computer program product of claim 12, wherein the deep learning architecture is a convolutional neural network.

18. The computer program product of claim 12, wherein the directed acyclic graph comprises in each of the first and the second branch a plurality of hidden layers.

19. A computer system comprising:
  one or more computer processors;
  one or more computer readable storage media; and
  program instructions stored on the one or more computer readable storage media for execution by at least one of the one or more computer processors, the program instructions comprising:
    program instructions to enable a comparison of different machine-learning models based on a single neural network design, wherein a deep learning architecture for an experimentation framework is represented as a directed acyclic graph with nodes representing neural network layers, wherein enabling a comparison of different machine-learning models comprises:
      program instructions to specify a first machine-learning model in a first branch of the directed acyclic graph, the first machine-learning model comprising at least one first optimizer node with a first set of related optimizer parameters;
      program instructions to specify a second machine-learning model in a second branch of the directed acyclic graph, the second machine-learning model comprising at least one second optimizer node with a second set of related optimizer parameters, different to the first optimizer node;
      program instructions to generate source code for the first machine-learning model and the second machine-learning model out of the directed acyclic graph; and
      program instructions to train the first machine-learning model and the second machine-learning model simultaneously, thereby enabling the comparison of different machine-learning models.

20. The computer system of claim 19, wherein the program instruction to specify a first machine-learning model in a first branch of the directed acyclic graph comprise:
  program instructions to specify a third optimizer node with a third set of related optimization parameters, parallel to the first optimizer node.

21. The computer system of claim 19, wherein the program instruction to specify a second machine-learning model in a second branch comprise:
  program instructions to specify a fourth optimizer node with a fourth set of related optimizer parameters, parallel to the second optimizer node.

22. The computer system of claim 19, wherein the program instructions stored on the one or more computer readable storage media further comprise:
  program instructions to compare quality accuracy values of the first trained machine-learning model against the second trained machine-learning model using validation and determining the machine-learning model generating better quality values.

23. The computer system of claim 21, wherein the program instructions to compare of the quality values is performed by a comparison node in the directed acyclic graph, the comparison node using the quality accuracy values of the first trained machine-learning model and the second training machine-learning model as input values, thereby determining which of the first or second machine-learning model should be used in an A/B testing.

* * * * *